(12) United States Patent
Jalan et al.

(10) Patent No.: US 10,050,928 B2
(45) Date of Patent: Aug. 14, 2018

(54) METHODS AND SYSTEMS FOR DETERMINING AN OPTIMAL SUBNET

(71) Applicant: DEVICE42, INC., Trumbull, CT (US)

(72) Inventors: Rajneesh Jalan, Trumbull, CT (US); Joseph Schmitt, Guilford, CT (US)

(73) Assignee: Device42, Inc., Trumbull, CT (US)

( * ) Notice: Subject to any disclaimer, the term of this patent is extended or adjusted under 35 U.S.C. 154(b) by 190 days.

(21) Appl. No.: 15/086,879

(22) Filed: Mar. 31, 2016

(65) Prior Publication Data

US 2017/0289095 A1 Oct. 5, 2017

(51) Int. Cl.
*G06F 15/16* (2006.01)
*H04L 29/12* (2006.01)
*G06F 17/30* (2006.01)

(52) U.S. Cl.
CPC .... *H04L 61/1552* (2013.01); *G06F 17/30991* (2013.01); *H04L 61/2007* (2013.01); *H04L 61/6068* (2013.01)

(58) Field of Classification Search
None
See application file for complete search history.

(56) References Cited

U.S. PATENT DOCUMENTS

| 9,628,328 B2 * | 4/2017 | Dietz | H04L 41/0806 |
| 2003/0053441 A1 * | 3/2003 | Banerjee | H04L 29/12216 |
| | | | 370/352 |
| 2009/0059785 A1 * | 3/2009 | Jogalekar | H04L 47/10 |
| | | | 370/230 |

* cited by examiner

*Primary Examiner* — Younes Naji
(74) *Attorney, Agent, or Firm* — Wiggin and Dana LLP; Gregory S. Rosenblatt; Matthew I. Burton

(57) ABSTRACT

Methods and systems for recommending an optimal subnet for assignment are disclosed. In some embodiments, the methods include the following: receiving a request for assignment of a subnet, the request including request data; accessing a subnet database to review a current register of subnets; querying the current register of subnets to determine a size of each of the available subnets and a number of available subnets positioned numerically before and after each of the available subnets thereby generating subnet availability data; applying predetermined subnet recommendation rules to both the request data and the subnet availability data to determine a recommended subnet for assignment; updating the current register to indicate that the recommended subnet for assignment is unavailable; presenting the recommended subnet; confirming assignment of the recommended subnet; and if assignment of the recommended subnet is not confirmed, updating the current register to indicate that the recommended subnet is available.

6 Claims, 3 Drawing Sheets

| Level | | | |
|---|---|---|---|
| Network | Group/Function | Subnet | IP Address |
| | A | Subnet 1 | IP Address 1.1 |
| | | | IP Address 1.2 |
| | | | IP Address 1.3 |
| | | | IP Address 1.4 |
| | | | IP Address 1.5 |
| | | Subnet 2 | IP Address 2.1 |
| | | | IP Address 2.2 |
| | B | Subnet 3 | IP Address 3.1 |
| | | | IP Address 3.2 |
| | | | IP Address 3.3 |
| | | | IP Address 3.4 |
| | | | IP Address 3.5 |
| | | | IP Address 3.6 |
| | | Subnet 4 | IP Address 4.1 |
| | | | IP Address 4.2 |
| | | | IP Address 4.3 |
| | | | IP Address 4.4 |
| | C | Subnet 5 | IP Address 5.1 |
| | | | IP Address 5.2 |
| | | | IP Address 5.3 |
| | | | IP Address 5.4 |
| | | | IP Address 5.5 |
| | | Subnet 6 | IP Address 6.1 |
| | | | IP Address 6.2 |

| Level | | | |
|---|---|---|---|
| Network | Group/Function | Subnet | IP Address |
| | A | Subnet 1 | IP Address 1.1 |
| | | | IP Address 1.2 |
| | | | IP Address 1.3 |
| | | | IP Address 1.4 |
| | | | IP Address 1.5 |
| | | Subnet 2 | IP Address 2.1 |
| | | | IP Address 2.2 |
| | B | Subnet 3 | IP Address 3.1 |
| | | | IP Address 3.2 |
| | | | IP Address 3.3 |
| | | | IP Address 3.4 |
| | | | IP Address 3.5 |
| | | | IP Address 3.6 |
| | | Subnet 4 | IP Address 4.1 |
| | | | IP Address 4.2 |
| | | | IP Address 4.3 |
| | | | IP Address 4.4 |
| | C | Subnet 5 | IP Address 5.1 |
| | | | IP Address 5.2 |
| | | | IP Address 5.3 |
| | | | IP Address 5.4 |
| | | | IP Address 5.5 |
| | | Subnet 6 | IP Address 6.1 |
| | | | IP Address 6.2 |

FIG. 1

METHODS AND SYSTEMS FOR DETERMINING AN OPTIMAL SUBNET

BACKGROUND

One function of an information technology (IT) department in a company is to manage the company's internet protocol (IP) addresses. It is not unusual for companies to manage thousands or even tens of thousands of IP addresses. To help manage IP addresses, companies often use subnets to make the process more manageable. Subnets are comprised of blocks of IP addresses.

Subnets are commonly identified by writing the starting IF address followed by a slash followed by the bit length of the subnet. For example, subnet 10.0.0.0/24 denotes a subnet with 256 IP addresses ranging from 10.0.0.0 to 10.0.0.255. Subnet 10.0.0.0/25 denotes a subnet with 128 IP addresses ranging from 10.0.0.0 to 10.0.0.127. It is common for IT departments to assign subnets of different sizes to internal departments and/or external customers, e.g., depending on function or group. FIG. 1, which includes generic nomenclature so as not to be limited to a specific numbering system, is a schematic diagram of a subnet register and includes nested subnets. The bottom level includes the IP addresses and any number of levels may be placed above depending on the particular application.

When you choose a subnet to assign, the subnet you choose will have a big impact on future subnets choices. If you choose a subnet that is much bigger than you need, then many other possible subnets are in effect wasted. If you choose a subnet that is near another subnet but not directly adjacent, the available subnets in between may be too small to be used and are effectively wasted. Existing technology often assigns the next available subnet regardless of future needs.

SUMMARY

Methods and systems according to the disclosed subject matter include a recommendation engine for choosing subnets. Based on predetermined criteria, the optimal subnet is determined and recommended to a user. In some embodiments, subnets that maximize future flexibility in subnet selection and assignment are determined and recommended to a user based on input from the user, predetermined selection criteria, and the current status and arrangement of available and unavailable subnets.

In some embodiments, predetermined criteria include subnet recommendation rules such as: (1) recommending a subnet including a default number of IP addresses based on a function or group associated with said IP addresses, e.g., all IP addresses assigned to a particular building are organized under a particular subnet; (2) recommending a subnet that includes a default number of unused subnets or IP addresses positioned before and after said recommended subnet based on the function or group associated with said IP addresses, e.g., ensuring there is sufficient room for expansion of a particular function/group based on identity of requester; (3) checking requester credentials to determine size or other limitations of the recommended subnet, e.g., some requesters may be limited assignment of a certain number subnets without additional approval; (4) evaluating a selection criteria if multiple subnets meet said subnet recommendation rules to determine the recommended subnet, e.g., weighting subnet recommendation rules or other scheme to determine recommended subnet. In some embodiments, the selection criteria include selecting said recommended subnet according to at least one of the group consisting of: an alphabetical designation, by a number of IP addresses, whether it is a last subnet of a group of subnets, where it is a subnet having a largest gap of unassigned subnets between it and an assigned subnet, and its fragmentation index

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein:

FIG. 1 is a schematic diagram of a subnet register according to some embodiments of the disclosed subject matter;

DETAILED DESCRIPTION

Figure 2:
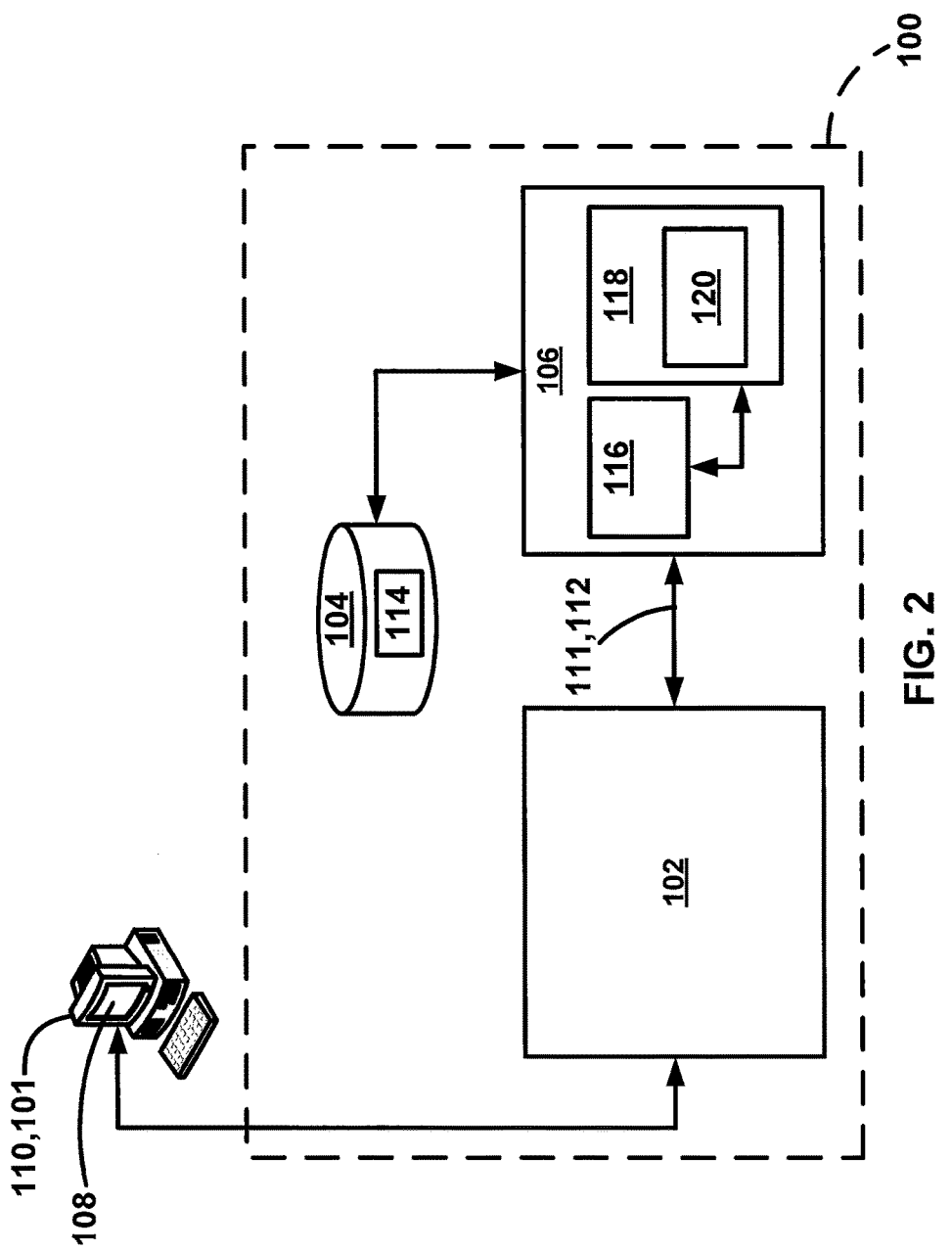
FIG. 2 is a schematic diagram of methods and systems according to some embodiments of the disclosed subject matter.
Figure 3:
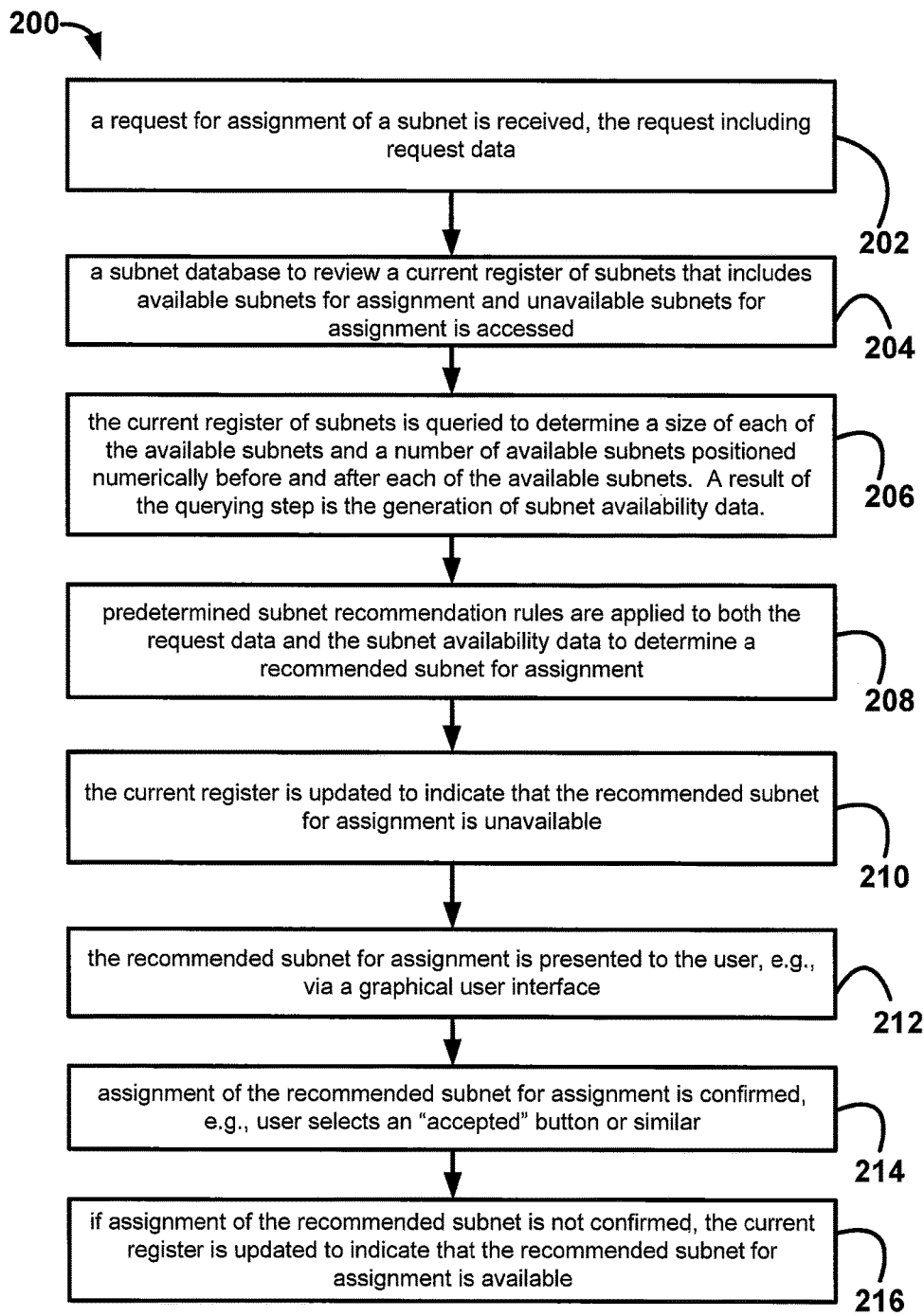
FIG. 3 is a chart of a method according to some embodiments of the disclosed subject matter.

Referring now to FIGS. 2 and 3, aspects of the disclosed subject matter include systems and methods for automating the process of determining and recommending an optimal subnet for assignment. Some embodiments include a system 100 for recommending an optimal subnet for assignment. In some embodiments, system 100 includes the following cooperating modules that together with a computer device 101 receive and transform data to determine and recommend an optimal subnet for assignment: a user interface module 102; a subnet database 104; and a computer processor module 106.

User interface module 102 includes mechanism, e.g., a graphical user interface 108, for allowing a user 110 to input data 111 and receive data 112 to and from the system. Typically, user 110 inputs a request for a subnet assignment and receives a recommended subnet.

Subnet database 104 includes a current register 114 of subnets available for assignment and subnets unavailable for assignment and corresponding IP addresses. Referring again to FIG. 1, where available subnets and IP addresses are in bold, register 114 is typically arranged in a nested, multi-level arrangement. IP addresses are on the bottom level. The level immediately above the IP addresses is the subnet level, e.g., IP Addresses 1.1-1.15 are under Subnet 1, and any number of additional levels, e.g., A-C, may be included on top of the subnet level depending on the application. For example Group/Function A may represent a particular building, and Subnets 1 and 2 may include IP addresses assigned to two rooms, 1 and 2, in the building.

Computer processor module 106 is in data communication with both user interface module 102 and subnet database 104. Computer processor module 106 includes one or more processors 116 configured to execute computer program instructions and computer storage media 118 encoded with computer program instructions 120 that, when executed by the one or more processors, cause computer device 101, e.g., personal computer, smartphone, etc., to determine and recommend an optimal subnet to user 110 via user interface module 102.

Referring now to FIG. 3, some embodiments of the disclosed subject matter include a method 200 performed by a data apparatus for recommending an optimal subnet for assignment. Some embodiments include a non-transitory computer storage media encoded with instructions according to method 200.

At 202, a request for assignment of a subnet is received, the request including request data. Request data typically includes an estimated number of IP addresses needed. The estimated number of IP addresses needed is often based on whether any future growth is likely and/or whether a requester is adding to an existing subnet of IP addresses. Request data includes requester information such as the function or group associated with the IP addresses and requester.

At 204, a subnet database to review a current register of subnets that includes available subnets for assignment and unavailable subnets for assignment is accessed. At 206, the current register of subnets is queried to determine a size of each of the available subnets and a number of available subnets positioned numerically before and after each of the available subnets. A result of the querying step is the generation of subnet availability data.

At 208, predetermined subnet recommendation rules are applied to both the request data and the subnet availability data to determine a recommended subnet for assignment. In some embodiments, the subnet recommendation rules include the following: (1) recommending a subnet including a default number of IP addresses based on a function or group associated with the IP addresses; (2) recommending a subnet that includes a default number of unused subnets or IP addresses positioned before and after the recommended subnet based on the function or group associated with the IP addresses; (3) checking the requester credentials to determine size or other limitations of the recommended subnet, e.g., only subnets that are designated as permitted to be assigned will be recommended and/or specific user may be limited to particular subnets; and (4) evaluating a selection criteria if multiple subnets meet the subnet recommendation rules to determine the recommended subnet. In some embodiments, the selection criteria include selecting said recommended subnet according to at least one of the group consisting of: an alphabetical designation, by a number of IP addresses, whether it is a last subnet of a group of subnets, where it is a subnet having a largest gap of unassigned subnets between it and an assigned subnet, and its fragmentation index.

At 210, the current register is updated to indicate that the recommended subnet for assignment is unavailable. At 212, the recommended subnet for assignment is presented to the user, e.g., via a graphical user interface. At 214, assignment of the recommended subnet for assignment is confirmed, e.g., user selects an "accepted" button or similar. At 216, if assignment of the recommended subnet is not confirmed, the current register is updated to indicate that the recommended subnet for assignment is available.

In some embodiments, the present disclosure is directed to a fragmentation index. The fragmentation index for a given subnet is the total number of subnets and IP addresses that will become unassignable with assignment of the given subnet, divided by the total number of subnets and IP addresses in the system. The assignable subnet with the lowest fragmentation index is the "optimal" candidate for assignment during the next request. In some embodiments, each subnet and IP address is displayed visually in a branching conformation, with visual identifiers used to differentiate assignable addresses from unassignable address. In some embodiments, this enables users to visualize the network and see assignable and unassignable addresses in an ordered manner, such as all those assignable addresses sharing a particular mask. In some embodiments, the visual identifiers are selected from the group consisting of: colors, alphanumerics, fonts, and the like and combinations thereof. Thus the system described herein efficiently distributes assignment of subnets and IP address while greatly simplifying and streamlining the assignment process.

For determining a fragmentation index, the system first produces a binary tree of each subnet and IP addresses. In some embodiments, the system indexes only those addresses associated with a particular mask. Each assignable and unassignable subnet and/or address is then marked accordingly. In some embodiments, the system implements a recursive method wherein relevant (properly sized) assignable subnets are analyzed to determine if the parent subnet is already assigned. In the event all parents are unassigned, the system analyzes the patents of the patent, and so on.

Methods and systems according to the disclosed subject matter offer advantages over known systems. No known systems recommend and or assign optimal subnets based on predetermined criteria. Methods and systems according to the disclosed subject matter include a subnet recommendation engine that optimizes use of a company's IP address space.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method performed by a data apparatus for recommending an optimal subnet for assignment, said method comprising:

receiving a request for assignment of the optimal subnet, said request including request data, wherein said request data includes an estimated number of IP addresses needed based on at least one of whether any future growth is likely and whether a requester is adding to an existing subnet of IP addresses;

accessing a subnet database to review a current register of subnets that includes available subnets for assignment and unavailable subnets for assignment;

querying said current register of subnets to determine a size of each of said available subnets and a number of available subnets positioned numerically before and after each of said available subnets, a result of said querying step being generation of subnet availability data;

applying predetermined subnet recommendation rules to both said request data and said subnet availability data to determine a recommended subnet for assignment by:

(1) recommending the optimal subnet including a default number of IP addresses based on a function or group associated with said default number of IP addresses, (2) recommending the optimal subnet that includes a default number of unused subnets or said default number of IP addresses positioned before and after the recommended subnet based on the function or group associated with said default number of IP addresses, (3) checking a requester credentials to determine size limitations of said recommended subnet, and (4) evaluating a selection criteria where when multiple subnets meet said subnet recommendation rules to determine said recommended subnet, wherein said selection criteria include selecting said recommended subnet according to at least one of the group consisting of an alphabetical designation, by a number of IP addresses, whether said recommended subnet is a last subnet of a group of subnets, where said recommended subnet is a subnet having a largest gap of unassigned subnets between the subnet having a largest gap and an assigned subnet, and said recommended subnet's fragmentation index:
updating said current register to indicate that said recommended subnet for assignment is unavailable;
presenting said recommended subnet for assignment;
confirming assignment of said recommended subnet for assignment; and
if assignment of said recommended subnet is not confirmed, updating said current register to indicate that said recommended subnet for assignment is available.

2. The method according to claim 1, wherein the request data includes requester information, said requester information including at least one of a function or group that are associated with said default number of IP addresses and the requester credentials.

3. A non-transitory computer storage media encoded with computer program instructions that, when executed by one or more processors, cause a computer device to perform an operation for recommending an optimal subnet for assignment, said operation comprising;
receiving a request for assignment of the optimal subnet, said request including request data, wherein said request data includes an estimated number of IP addresses needed based on at least one of whether any future growth is likely and whether a requester is adding to an existing subnet of IP addresses;
accessing a subnet database to review a current register of subnets that includes available subnets for assignment and unavailable subnets for assignment;
querying said current register of subnets to determine a size of each of said available subnets and a number of available subnets positioned numerically before and after each of said available subnets, a result of said querying step being generation of subnet availability data;
applying predetermined subnet recommendation rules to both said request data and said subnet availability data to determine a recommended subnet for assignment, wherein said request data includes requester information and subnet recommendation rules include:
(1) recommending the optimal subnet including a default number of IP addresses based on a function or group associated with the default number of IP addresses;
(2) recommending the optimal subnet that includes a default number of unused subnets or the default number of IP addresses positioned before and after the recommended subnet based on the function or group associated with the default number of IP addresses;
(3) checking a requester credentials to determine size or other limitations of the recommended subnet; and
(4) evaluating a selection criteria if multiple subnets meet the subnet recommendation rules to determine the recommended subnet wherein said selection criteria include selecting said recommended subnet according to at least one of the group consisting of an alphabetical designation, by a number of IP addresses, whether said recommended subnet is a last subnet of a group of subnets, where said recommended subnet is a subnet having a largest gap of unassigned subnets between the subnet having a largest gap and an assigned subnet, and its said recommended subnet's fragmentation index;
updating said current register to indicate that said recommended subnet for assignment is unavailable;
presenting said recommended subnet for assignment;
confirming assignment of said recommended subnet for assignment; and
if assignment of said recommended subnet is not confirmed, updating said current register to indicate that said recommended subnet for assignment is available.

4. The computer storage media according to claim 3, wherein the request data includes requester information.

5. The computer storage media according to claim 4, wherein said requester information includes at least one of a function or group that are associated with said default number of IP addresses and the requester credentials.

6. A system for recommending an optimal subnet for assignment, said system comprising:
a user interface module for allowing a user to input a request for assignment of the optimal subnet via said user interface module, said request including request data, wherein said request data includes an estimated number of IP addresses needed based on at least one of whether any future growth is likely and whether a requester is adding to an existing subnet of IP addresses;
a subnet database for maintaining a current register of subnets available for assignment and subnets unavailable for assignment and corresponding IP addresses; and
a computer processor module in data communication with both said user interface module, including one or more processors configured to execute computer program instructions and computer storage media encoded with said computer program instructions that, when executed by said one or more processors, cause a computer device to:
access the subnet database to review said current register of subnets;
querying said current register of subnets to determine a size of each of said available subnets and a number of available subnets positioned numerically before and after each of said available subnets, a result of said querying step being generation of subnet availability data;
applying predetermined subnet recommendation rules to both said request data and said subnet availability data to determine a recommended subnet for assignment by:
(1) recommending the optimal subnet including a default number of IP addresses based on a function or group associated with the default number of IP addresses;
(2) recommending the optimal subnet that includes a default number of unused subnets or the default number of IP addresses positioned before and after the recommended subnet based on the function or group associated with the default number of IP addresses;
(3) checking a requester credentials to determine size or other limitations of the recommended subnet; and
(4) evaluating a selection criteria if multiple subnets meet the subnet recommendation rules to determine the recommended subnet wherein said selection criteria include selecting said recommended subnet according to at least one of the group consisting of an alphabetical designation, by a number of IP addresses, whether said recommended subnet is a last subnet of a group of subnets, where said recommended subnet is a subnet having a largest gap of unassigned subnets between the subnet having a largest gap and an assigned subnet, and its said recommended subnets fragmentation index;

updating said current register to indicate that said recommended subnet for assignment is unavailable; presenting said recommended subnet for assignment to said user via said user interface module;

confirming assignment of said recommended subnet for assignment via said user interface module; and if assignment of said recommended subnet is not confirmed, updating said current register to indicate that said recommended subnet for assignment is available.

* * * * *